(12) United States Patent
Diemer et al.

(10) Patent No.: US 8,978,860 B2
(45) Date of Patent: Mar. 17, 2015

(54) TRANSMISSION FOR A VEHICLE AND A METHOD OF ASSEMBLING THE TRANSMISSION

(75) Inventors: John A. Diemer, Farmington Hills, MI (US); Nina Khakham, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 13/611,471

(22) Filed: Sep. 12, 2012

(65) Prior Publication Data

US 2014/0069766 A1   Mar. 13, 2014

(51) Int. Cl.
*F16D 25/12* (2006.01)
*F16D 25/0638* (2006.01)
*F16D 48/02* (2006.01)
*F16H 61/00* (2006.01)

(52) U.S. Cl.
CPC ............ *F16D 25/0638* (2013.01); *F16D 25/12* (2013.01); *F16D 2048/0224* (2013.01); *F16D 2300/26* (2013.01); *F16H 2061/0046* (2013.01); *Y10T 29/49464* (2013.01)

USPC ........................................ 192/115; 192/85.17

(58) Field of Classification Search
CPC ............................................ F16H 2057/02026
USPC ............................................... 192/85.25, 115
See application file for complete search history.

(56) References Cited

U.S. PATENT DOCUMENTS 5,483,850 A * 1/1996 Yamauchi ................... 74/606 R \* cited by examiner

*Primary Examiner* — Rodney H Bonck
(74) *Attorney, Agent, or Firm* — Quinn Law Group, PLLC

(57) ABSTRACT

A transmission for a vehicle and a method of assembling the transmission of the vehicle are disclosed. The transmission includes a housing defining a cavity and a recess disposed inside the housing. The recess extends outwardly away from the cavity along a longitudinal axis. The transmission further includes a clutch disposed inside the cavity. In addition, the transmission includes a guide member disposed inside the cavity and defining a first path and a second path spaced from each other. At least one of the first and second paths is in fluid communication with the clutch. The guide member includes a mounting portion disposed in the recess and engaging the housing in an interference fit to secure the guide member to the housing.

18 Claims, 4 Drawing Sheets

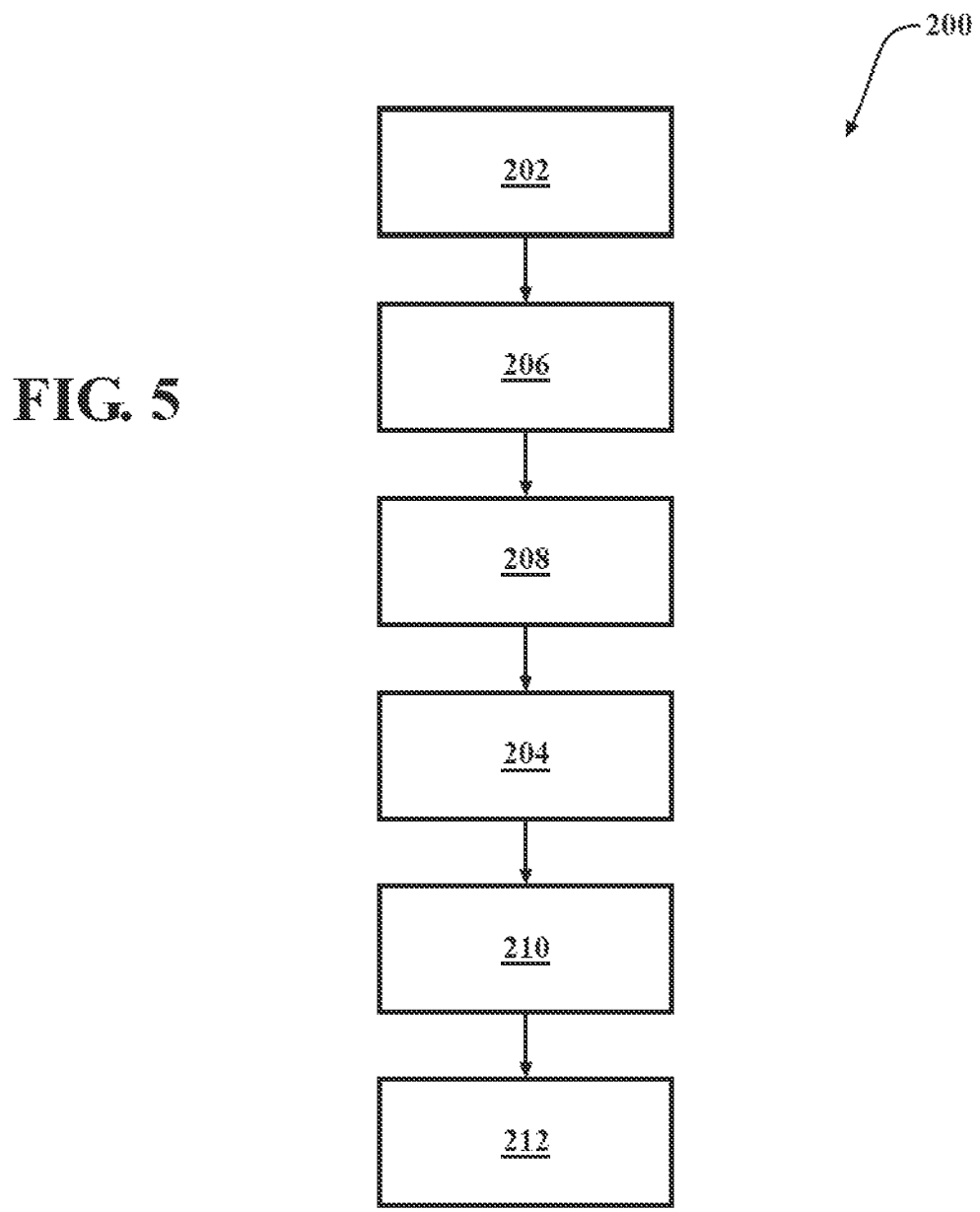

TRANSMISSION FOR A VEHICLE AND A METHOD OF ASSEMBLING THE TRANSMISSION

TECHNICAL FIELD

The present disclosure relates to a transmission for a vehicle and a method of assembling the transmission of the vehicle.

BACKGROUND

Various transmissions have been developed for vehicles. One type of transmission includes a casing having a clutch disposed therein. Generally, fluid is delivered to the clutch. A fluid transfer device can be utilized to deliver fluid to the clutch. The fluid transfer device is mounted to the casing utilizing one or more fasteners, and thus, the fluid transfer device is configured with an outer diameter large enough to accommodate the fasteners as well as holes to deliver the fluid. The size of the fluid transfer device can affect spinloss.

SUMMARY

The present disclosure provides a transmission for a vehicle. The transmission includes a housing defining a cavity and a recess disposed inside the housing. The recess extends outwardly away from the cavity along a longitudinal axis. The transmission further includes a clutch disposed inside the cavity. In addition, the transmission includes a guide member disposed inside the cavity and defining a first path and a second path spaced from each other. At least one of the first and second paths is in fluid communication with the clutch. The guide member includes a mounting portion disposed in the recess and engaging the housing in an interference fit to secure the guide member to the housing.

The present disclosure also provides a method of assembling a transmission of a vehicle. A housing is provided, with the housing defining a cavity and a recess disposed inside the housing. The recess extends outwardly away from the cavity along a longitudinal axis. A clutch is operatively coupling to the housing within the cavity. The guide member is disposed in the cavity, with the guide member defining a first path and a second path, and with at least one of the first and second paths in fluid communication with the clutch. A mounting portion of the guide member is inserted into the recess such that the mounting portion of the guide member engages the housing in an interference fit to secure the guide member to the housing.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 5 is a schematic flowchart of a method of assembling the transmission.

DETAILED DESCRIPTION

Figure 1:
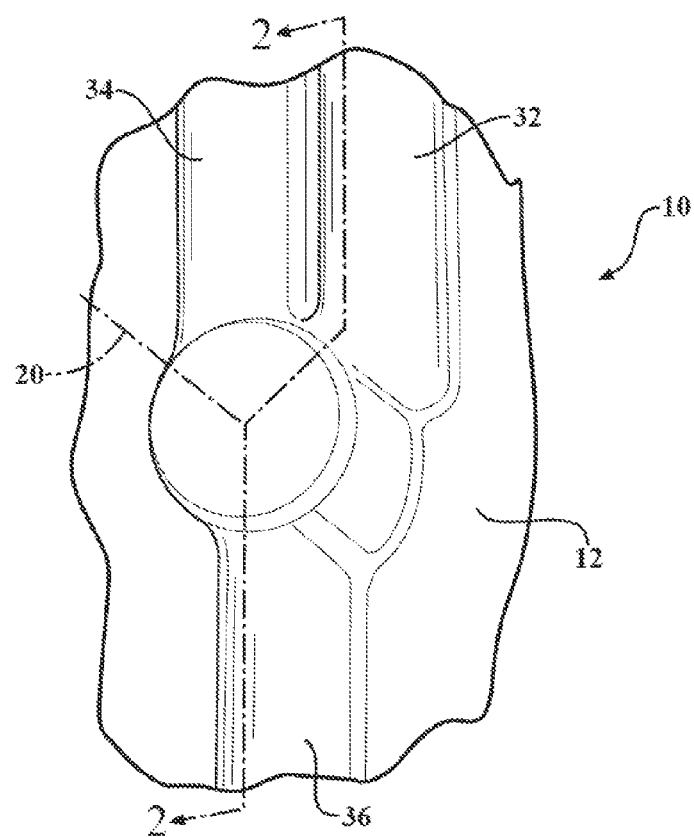
FIG. 1 is a schematic perspective view of an outside of a housing of a transmission.
Figure 2:
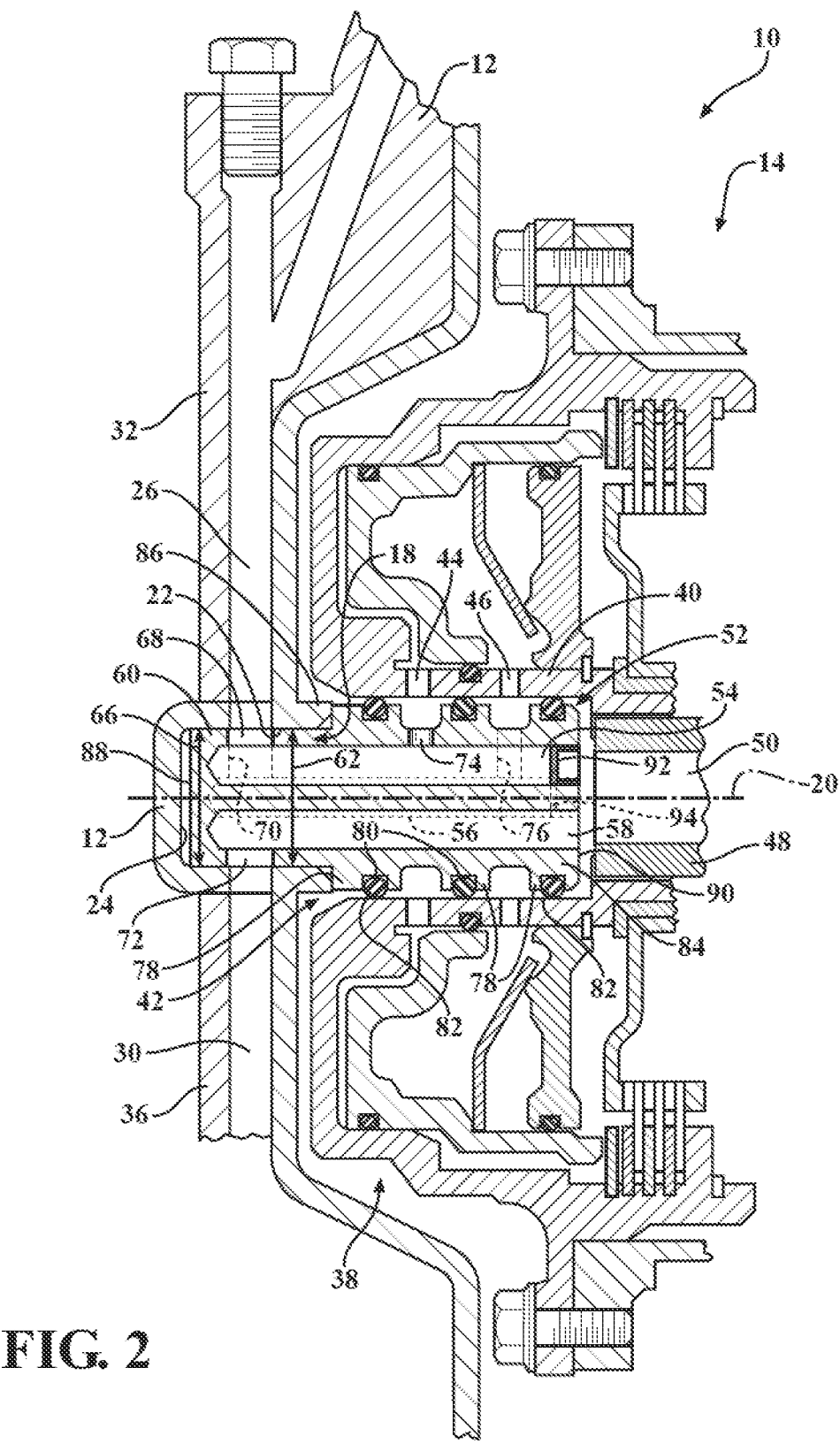
FIG. 2 is a schematic cross-sectional view of the transmission generally taken from lines 2-2 of FIG. 1.

Referring to the Figures, wherein like numerals indicate like or corresponding parts throughout the several views, a transmission 10 for a vehicle is generally shown in FIGS. 1 and 2.

In certain embodiments, the transmission 10 for the vehicle can be a hybrid vehicle transmission. The hybrid vehicle transmission can include a first motor/generator and/or a second motor/generator as known to those skilled in the art. In various embodiments, the first and/or second motors can be electric motors. It is to be appreciated that the transmission 10 can include other components not specifically discussed herein. It is to also be appreciated that the transmission 10 can be utilized for vehicles other than a hybrid vehicle transmission.

The transmission 10 includes a housing 12 defining a cavity 14. More specifically, the cavity 14 is disposed inside the housing 12. Generally, FIG. 1 illustrates the housing 12 from outside of the transmission 10 and FIGS. 2-4 illustrate the housing 12 from inside of the transmission 10.

Figure 3:
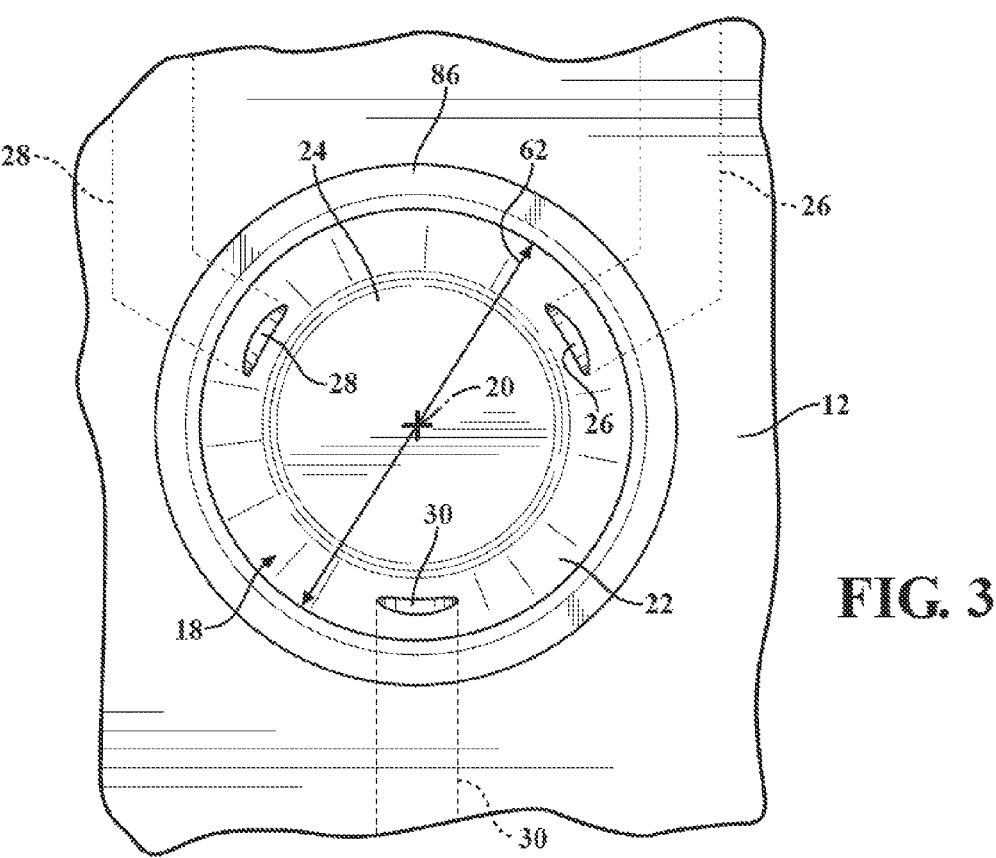
FIG. 3 is a schematic side view of an inside of the housing illustrating a recess and a wall portion of the recess, with a first channel, a second channel and a third channel intersecting the wall portion.
Figure 4:
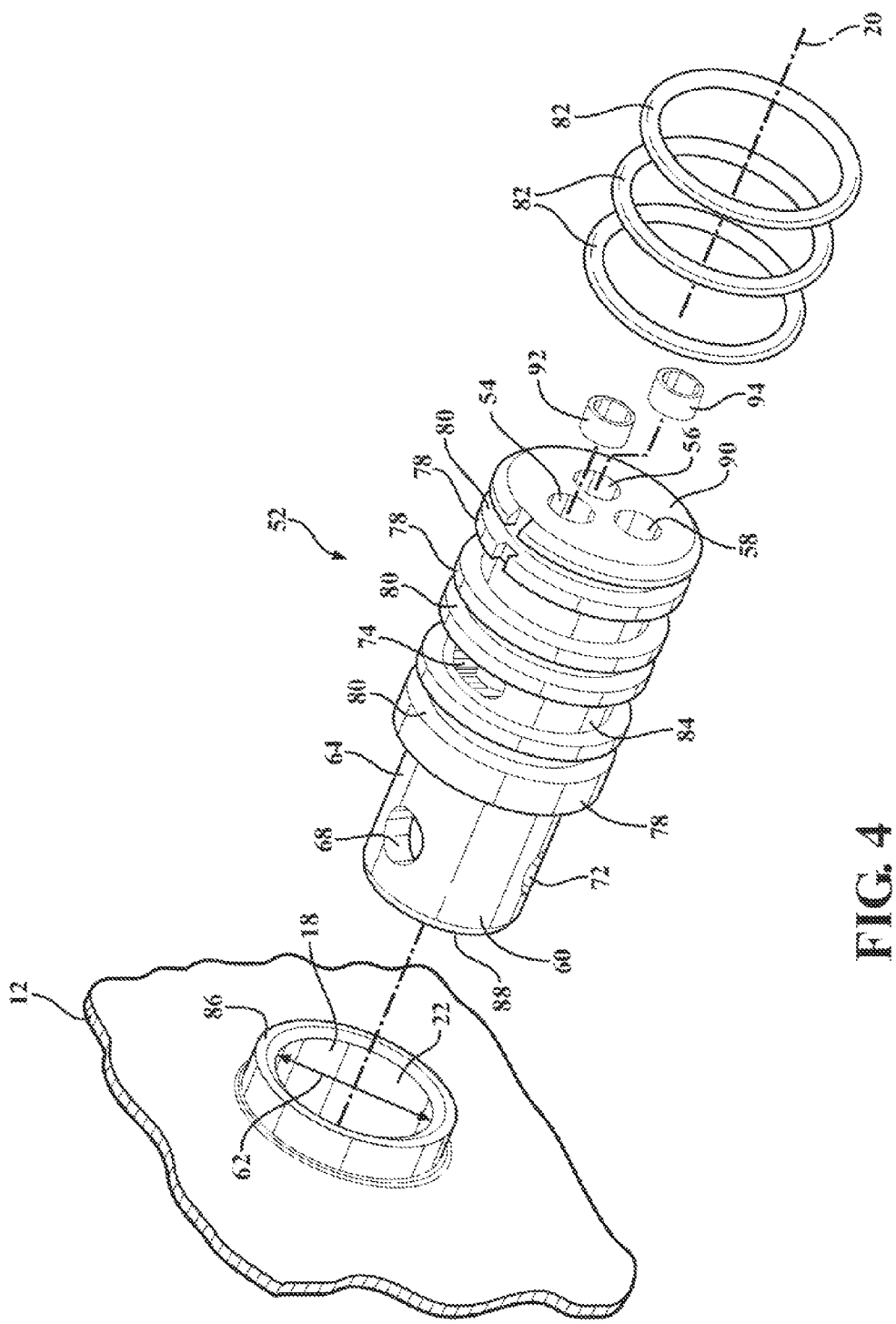
FIG. 4 is a schematic exploded view of the housing, a guide member, a plurality of seals and a plurality of plugs.

Referring to FIGS. 2 and 3, the housing 12 defines a recess 18 disposed inside the housing 12, with the recess 18 extending outwardly away from the cavity 14 along a longitudinal axis 20. The recess 18 includes a wall portion 22 defined by the housing 12. In certain embodiments, the wall portion 22 is disposed radially about the longitudinal axis 20 within the recess 18.

Furthermore, the recess 18 can extend outwardly away from the cavity 14 along the longitudinal axis 20 to a base portion 24 defined by the housing, with the base portion disposed transverse to the longitudinal axis 20. Generally, the base portion 24 is disposed in the recess 18. Therefore, the base portion 24 is disposed adjacent to the wall portion 22 within the recess 18.

Continuing with FIGS. 2 and 3, the housing 12 can define a first channel 26, a second channel 28 and a third channel 30 each disposed transverse to the longitudinal axis 20 and each intersecting the wall portion 22 of the recess 18. In certain embodiments, referring to FIG. 1, the housing 12 can include a first cover 32 cooperating with the first channel 26, a second cover 34 cooperating with the second channel 28 and a third cover 36 cooperating with the third channel 30. In other words, the first cover 32 defines the first channel 26, the second cover 34 defines the second channel 28 and the third cover 36 defines the third channel 30. Therefore, with regard to FIGS. 1 and 3, the first and second channels 26, 28 feed into the recess 18 from one side of the longitudinal axis 20 and the third channel 30 feeds into the recess 18 from another side of the longitudinal axis 20.

In certain embodiments, the housing 12 is formed of metal. In one embodiment, the metal is an alloy. One suitable alloy is an aluminum alloy. It is to be appreciated that the housing 12 can be formed of any suitable metal, alloy or composite.

Referring to FIG. 2, the transmission 10 also includes a clutch 38 disposed inside the cavity 14. More specifically, the clutch 38 is operatively coupled to the housing 12 within the cavity 14. Generally, the clutch 38 can be rotatable about the longitudinal axis 20. Therefore, in certain embodiments, the clutch 38 is a rotating-type clutch. It is to be appreciated that the clutch 38 can be any other suitable type of clutch.

The clutch 38 can include a hub 40 rotatable about the longitudinal axis 20. The hub 40 can define an aperture 42 along the longitudinal axis 20 and will be discussed further below. In addition, the hub 40 can define a first passage 44 and a second passage 46 each transverse to the longitudinal axis 20. The first and second passages 44, 46 will also be discussed further below.

Continuing with FIG. 2, the transmission 10 can further include a shaft 48 disposed in the cavity 14 and rotatable about the longitudinal axis 20. Generally, the shaft 48 is partially disposed through the aperture 42 of the hub 40. The shaft 48 and the hub 40 of the clutch 38 can be rotatable independently of each other or the shaft 48 and the hub 40 of the clutch 38 can rotate simultaneously or synchronized with each other. The shaft 48 defines a passageway 50 along the longitudinal axis 20 which will be discussed further below.

Turning to FIGS. 2 and 4, the transmission 10 further includes a guide member 52 disposed inside the cavity 14. The hub 40 defines the aperture 42 along the longitudinal axis 20 such that a portion of the guide member 52 is disposed in the aperture 42. The guide member 52 is secured to the housing 12 (as discussed further below) such that the guide member 52 remains stationary as the clutch 38 rotates about the portion of the guide member 52.

In certain embodiments, the guide member 52 is formed of metal. In one embodiment, the metal is an alloy. One suitable alloy is steel. It is to be appreciated that the guide member 52 can be formed of any suitable metal, alloy or composite.

The guide member 52 defines a first path 54 and a second path 56 spaced from each other. Generally, at least one of the first and second paths 54, 56 is in fluid communication with the clutch 38. Furthermore, the first channel 26 of the housing 12 and the first path 54 are in fluid communication with each other, and the second channel 28 of the housing 12 and the second path 56 are in fluid communication with each other. In addition, the first passage 44 of the hub 40 is in fluid communication with the first path 54 and the second passage 46 of the hub 40 is in fluid communication with the second path 56.

In certain embodiments, the guide member 52 also defines a third path 58 spaced from the first and second paths 54, 56, with the first and second paths 54, 56 in fluid communication with the clutch 38 and the third path 58 in fluid communication with the shaft 48. Specifically, the passageway 50 of the shaft 48 is in fluid communication with the third path 58. Furthermore, the third channel 30 of the housing 12 and the third path 58 are in fluid communication with each other.

The first, second and third paths 54, 56, 58 are spaced from each other radially about the longitudinal axis 20 as shown in FIGS. 2 and 4. Furthermore, in certain embodiments, the first, second and third paths 54, 56, 58 are substantially parallel to each other along the longitudinal axis 20 as shown in FIG. 2. It is to be appreciated that the first, second and third paths 54, 56, 58 can extend through the guide member 52 in any suitable orientation and location.

Generally, a fluid is guided through the first, second and third paths 54, 56, 58 of the guide member 52. For example, fluid flows through the first channel 26 of the housing 12 into the first path 54 of the guide member 52 and out the first passage 44 to the clutch 38. As another example, fluid flows through the second channel 28 of the housing 12 into the second path 56 of the guide member 52 and out the second passage 46 to the clutch 38. As yet another example, fluid flows through the third channel 30 of the housing 12 into the third path 58 of the guide member 52 and into the passageway 50 of the shaft 48. Specifically, fluid is delivered through the first and second paths 54, 56 to the clutch 38 and fluid is delivered through the third path 58 to a desired component, such as a gear box, a bearing device, etc. With regard to the third path 58, fluid is guided through the third path 58 into the passageway 50 of the shaft 48 and to the desired component.

In certain embodiments, the fluid is a lubricant. In one embodiment, the fluid is oil. It is to be appreciated that the same type of fluid can be guided through the first, second and third paths 54, 56, 58. It is to also be appreciated that different types of fluid can be guided through the first, second and/or third paths 54, 56, 58. It is to further be appreciated that any suitable fluid can be utilized.

The guide member 52 includes a mounting portion 60 disposed in the recess 18 and engaging the housing 12 in an interference fit to secure the guide member 52 to the housing 12. Furthermore, the mounting portion 60 can engage the housing 12 in the interference fit to seal between the mounting portion 60 and the housing 12. In addition, the guide member 52 is secured to the housing 12 by the interference fit such that fasteners, as discussed in the background section above, can be eliminated. It is to be appreciated that the interference fit can include press fitting, friction fitting or any other suitable interference fit.

In certain embodiments, the mounting portion 60 engages the wall portion 22 in the interference fit. Furthermore, the mounting portion 60 can engage the wall portion 22 in the interference fit to seal between the mounting portion 60 and the wall portion 22 of the recess 18. Therefore, generally, the guide member 52 is secured to the housing 12 such that the fluid is guided through the first, second and third paths 54, 56, 58 of the guide member 52 and minimizes leaking of the fluid out into the cavity 14 of the housing 12 between the mounting portion 60 and the wall portion 22 of the recess 18.

Specifically, the wall portion 22 defines an inner diameter 62 and the mounting portion 60 includes an outer surface 64 defining an outer diameter 66 complimentary to the inner diameter 62 such that the outer surface 64 engages the wall portion 22 when the mounting portion 60 is disposed in the recess 18 to provide the interference fit. As such, this interference fit secures the guide member 52 to the wall portion 22 while also minimizing leaking of the fluid out into the cavity 14 between the outer surface 64 of the mounting portion 60 and the wall portion 22 of the recess 18.

As mentioned above, securing the guide member 52 to the housing 12 by the interference fit allows the fasteners, as discussed in the background section above, to be eliminated; therefore, the outer diameter 66 of the mounting portion 60 can be reduced because space for fasteners are not required. Reducing the outer diameter 66 of the mounting portion 60 allows the overall size of the guide member 52 to be reduced. Reducing the size of the guide member 52 can reduce spin-loss, material costs, etc.

The outer diameter 66 of the mounting portion 60 can change depending on the number of paths 54, 56, 58 being utilized, the desired material thickness between the paths 54, 56, 68 and/or the desired diameter of the paths 54, 56, 58. In certain embodiments, the outer diameter 66 of the mounting portion 60 is from about 20 millimeters to about 35 millimeters. In other embodiments, the outer diameter 66 of the mounting portion 60 is from about 25 millimeters to about 30 millimeters. It is to be appreciated that the outer diameter 66 can be any suitable diameter.

The first, second and third paths 54, 56, 58 each extend into the mounting portion 60 of the guide member 52 along the longitudinal axis 20. As mentioned above, in certain embodiments, the first, second and third paths 54, 56, 58 are substantially parallel to each other along the longitudinal axis 20 as shown in FIG. 2. Continuing with FIG. 2, the mounting portion 60 can define a first inlet 68 transverse to the longitudinal axis 20 to intersect the first path 54 such that the first inlet 68 is in fluid communication with the first path 54. The first inlet 68 is also in fluid communication with the first channel 26 of the housing 12.

In addition, the mounting portion 60 can define a second inlet 70 transverse to the longitudinal axis 20 to intersect the second path 56 such that the second inlet 70 is in fluid communication with the second path 56. The second inlet 70 is also in fluid communication with the second channel 28 of the housing 12.

Furthermore, the mounting portion 60 can define a third inlet 72 transverse to the longitudinal axis 20 to intersect the third path 58 such that the third inlet 72 is in fluid communication with the third path 58. The third inlet 72 is also in fluid communication with the third channel 30 of the housing 12.

Continuing with FIGS. 2 and 3, the mounting portion 60 engages the wall portion 22 in the interference fit such that the first inlet 68 aligns with the first channel 26 to provide fluid communication between the first channel 26 and the first inlet 68. Similarly, the mounting portion 60 engages the wall portion 22 in the interference fit such that the second inlet 70 aligns with the second channel 28 to provide fluid communication between the second channel 28 and the second inlet 70. In addition, the mounting portion 60 engages the wall portion 22 in the interference fit such that the third inlet 72 aligns with the third channel 30 to provide fluid communication between the third channel 30 and the third inlet 72.

Referring to FIGS. 2 and 4, generally, the guide member 52 can define a first outlet 74 transverse to the longitudinal axis 20 to intersect the first path 54 such that the first outlet 74 is in fluid communication with the first path 54. More specifically, the first outlet 74 is in fluid communication with the first path 54 and the clutch 38. Specifically, the first passage 44 of the hub 40 is in fluid communication with the first outlet 74. In certain embodiments, the first outlet 74 is spaced from the first inlet 68.

Furthermore, the guide member 52 can define a second outlet 76 transverse to the longitudinal axis 20 to intersect the second path 56 such that the second outlet 76 is in fluid communication with the second path 56. More specifically, the second outlet 76 is in fluid communication with the second path 56 and the clutch 38. Specifically, the second passage 46 of the hub 40 is in fluid communication with the second outlet 76. In certain embodiments, the second outlet 76 is spaced from the second inlet 70.

Therefore, the first inlet 68 intersects the first path 54 and the first outlet 74 intersects the first path 54 such that the first inlet 68 and the first outlet 74 are in fluid communication with each other. As such, fluid is guided or delivered through the first channel 26 of the housing 12, through the first inlet 68, through the first path 54, out the first outlet 74 and through the first passage 44 to the clutch 38. Similarly, the second inlet 70 intersects the second path 56 and the second outlet 76 intersects the second path 56 such that the second inlet 70 and the second outlet 76 are in fluid communication with each other. Therefore, fluid is guided or delivered through the second channel 28 of the housing 12, through the second inlet 70, through the second path 56, out the second outlet 76 and through the second passage 46 to the clutch 38. In addition, the third inlet 72 intersects the third path 58 such that the third inlet 72 and the third path 58 are in fluid communication with each other. Therefore, fluid is guided or delivered through the third channel 30 of the housing 12, through the third inlet 72 and through the third path 58 to the passageway 50 of the shaft 48.

Turning to FIGS. 2 and 4, generally, the guide member 52 can include a plurality of flanges 78 spaced from each other along the longitudinal axis 20 and each extending outwardly away from the longitudinal axis 20. In certain embodiments, each of the flanges 78 define a groove 80 facing the clutch 38. As shown in FIG. 2, the first outlet 74 is disposed between a pair of the flanges 78 and the second outlet 76 is disposed between another pair of the flanges 78. It is to be appreciated that one of the flanges 78 can be utilized in both pairs of flanges 78.

The transmission 10 can further include a plurality of seals 82, with one of the seals 82 disposed in each of the grooves 80 and each of the seals 82 engage the clutch 38 for sealing between the flanges 78 and the clutch 38. Specifically, the seals 82 engage respective flanges 78 and the hub 40 of the clutch 38. The first outlet 74 is disposed between a pair of the seals 82, and similarly, the second outlet 76 is disposed between another pair of the seals 82. The seals 82 minimize leaking of the fluid into the cavity 14. More specifically, the seals 82 minimize leaking of the fluid between the first and second outlets 74, 76 of the guide member 52 and the clutch 38. It is to be appreciated that one of the seals 82 can be utilized in both pairs of seals 82.

Furthermore, the guide member 52 can include a stem portion 84 adjacent to the mounting portion 60 along the longitudinal axis 20. The portion of the guide member 52, mentioned above, is further defined as the stem portion 84 disposed in the aperture 42 of the hub 40. Generally, the first and second paths 54, 56 each extend into the mounting and stem portions 60, 84 along the longitudinal axis 20. Specifically, the first, second and third paths 54, 56, 58 each extend into the mounting and stem portions 60, 84 along the longitudinal axis 20.

In certain embodiments, the flanges 78 extend from the stem portion 84 as shown in FIGS. 2 and 4. More specifically, the stem portion 84 can also include the outer surface 64 with the flanges 78 extending from the outer surface 64. Therefore, the outer surface 64 of the stem portion 84 can define the outer diameter 66 as discussed above for the mounting portion 60. As such, the flanges 78 extend outwardly from the outer surface 64 of the stem portion 84 to define an outer diameter greater than the outer diameter 66 of the outer surface 64.

As mentioned above, securing the guide member 52 to the housing 12 by the interference fit allows the fasteners, as discussed in the background section above, to be eliminated; therefore, the outer diameter 66 of the mounting and stem portions 60, 84 can be reduced because space for fasteners are not required. Reducing the outer diameter 66 of the mounting and stem portions 60, 84 allow the overall size of the guide member 52 to be reduced. Therefore, as discussed above, reducing the size of the guide member 52 can reduce spinloss, material costs, etc.

The outer diameter 66 of the mounting and stem portions 60, 84 can change depending on the number of paths 54, 56, 58 being utilized, the desired material thickness between the paths 54, 56, 68 and/or the desired diameter of the paths 54, 56, 58. The outer diameter 66 of the stem portion 84 can be the same or different from the outer diameter 66 of the mounting portion 60.

Continuing with FIGS. 2 and 4, in certain embodiments, the stem portion 84 of the guide member 52 defines the first and second outlets 74, 76. Therefore, the stem portion 84 can define the first outlet 74 transverse to the longitudinal axis 20 to intersect the first path 54 such that the first path 54, the first outlet 74 and the first passage 44 of the hub 40 are in fluid communication with each other. Similarly, the stem portion 84 can define the second outlet 76 transverse to the longitudinal axis 20 to intersect the second path 56 such that the second path 56, the second outlet 76 and the second passage 46 of the hub 40 are in fluid communication with each other.

As best shown in FIGS. 2 and 4, the housing 12 can include an abutment 86 extending outwardly into the cavity along the longitudinal axis 20 adjacent to the recess 18. Generally, one of the flanges 78 of the guide member 52 engage the abutment 86 such that the flanges 78 are disposed outside of the recess 18 (see FIG. 2). More specifically, one of the flanges 78 of the stem portion 84 engage the abutment 86 when the mounting portion 60 is disposed in the recess 18 such that the flanges 78 are disposed outside of the recess 18. Furthermore, having one of the flanges 78 engage the abutment 86 provides that the mounting portion 60 is inserted into the recess 18 of the housing 12 to a depth that the first, second and third channels 26, 28, 30 align with the first, second and third inlets 68, 70, 72 respectively.

Continuing with FIGS. 2 and 4, the mounting portion 60 can include a first distal end 88 facing the base portion 24 within the recess 18 and the stem portion 84 can include a second distal end 90 spaced from the first distal end 88 along the longitudinal axis 20. Generally, the second distal end 90 is disposed outside of the recess 18. In other words, when the guide member 52 is secured to the housing 12, the second distal end 90 is spaced from the recess 18 and disposed in the cavity 14 as shown in FIG. 2. The first and second paths 54, 56 extend into the mounting and stem portions 60, 84 along the longitudinal axis 20 such that the first and second paths 54, 56 are spaced from the first distal end 88 and the first and second paths 54, 56 intersect the second distal end 90 as best shown in FIG. 4. More specifically, the first, second and third paths 54, 56, 58 extend into the mounting and stem portions 60, 84 such that the first, second and third paths 54, 56, 58 are spaced from the first distal end 88 and the first, second and third paths 54, 56, 58 intersect the second distal end 90 (see FIG. 4). With regard to the third channel 30 and the third path 58, the fluid is guided or delivered through the third channel 30 of the housing 12, through the third inlet 72, through the third path 58, out the second distal end 90 of the stem portion 84 and into the passageway 50 of the shaft 48. It is to be appreciated that the first, second and third paths 54, 56, 58 can intersect the first distal end 88.

Continuing with FIGS. 2 and 4, the transmission 10 can further include a first plug 92 disposed in the first path 54 and a second plug 94 disposed in the second path 56. More specifically, the first plug 92 is disposed in the first path 54 adjacent to the second distal end 90 for minimizing fluid communication outside of the first path 54 at the second distal end 90. Similarly, the second plug 94 is disposed in the second path 56 adjacent to the second distal end 90 for minimizing fluid communication outside of the second path 56 at the second distal end 90. In other words, the first plug 92 plugs the first path 54 at the second distal end 90 and the second plug 94 plugs the second path 56 at the second distal end 90. Therefore, the fluid moves through the first channel 26 of the housing 12, through the first inlet 68 and through the first path 54 out the first outlet 74. Similarly, the fluid moves through the second channel 28 of the housing 12, through the second inlet 70 and through the second path 56 out the second outlet 76.

Also referring to FIG. 5, the present disclosure further provides a method 200 of assembling the transmission 10 of the vehicle. The method 200 includes providing 202 the housing 12 defining the cavity 14 and the recess 18 disposed inside the housing 12. As discussed above, the recess 18 extends outwardly away from the cavity 14 along the longitudinal axis 20. The method 200 also includes operatively coupling 204 the clutch 38 to the housing 12 within the cavity 14. Furthermore, the method 200 includes disposing 206 the guide member 52 in the cavity 14, with the guide member 52 defining the first path 54 and the second path 56, and with at least one of the first and second paths 54, 56 in fluid communication with the clutch 38.

In addition, the method 200 includes inserting 208 the mounting portion 60 of the guide member 52 into the recess 18 such that the mounting portion 60 of the guide member 52 engages the housing 12 in the interference fit to secure the guide member 52 to the housing 12. More specifically, inserting 208 the mounting portion 60 of the guide member 52 into the recess 18 can include inserting the mounting portion 60 into the recess 18 until the flange 78 of the stem portion 84 engages the abutment 86 of the housing 12 to align the first inlet 68 of the mounting portion 60 with the first channel 26 of the housing 12, to align the second inlet 70 of the mounting portion 60 with the second channel 28 of the housing 12 and to align the third inlet 72 of the mounting portion 60 with the third channel 30 of the housing 12.

Generally, inserting 208 the mounting portion 60 into the recess 18 occurs before operatively coupling 204 the clutch 38 to the housing 12. Therefore, the method 200 can also include engaging 210 the hub 40 of the clutch 38 with the seals 82 that are attached to the guide member 52 as the clutch 38 is operatively coupled to the housing 12.

The method 200 can also include inserting 212 the shaft 48 into the cavity 14 of the housing 12 such that the clutch 38 surrounds a portion of the shaft 48. More specifically, inserting 212 the shaft 48 into the cavity 14 can include operatively coupling the shaft 48 to the clutch 38. Generally, operatively coupling 204 the clutch 38 to the housing 12 occurs before inserting 212 the shaft 48 into the cavity 14. Furthermore, disposing 206 the guide member 52 in the cavity 14 and inserting 208 the mounting portion 60 of the guide member 52 into the recess 18 occurs before inserting 212 the shaft 48 into the cavity 14.

It is to be appreciated that the order or sequence of performing the method 200 as identified in the flowchart of FIG. 5 is for illustrative purposes and other orders or sequences are within the scope of the present disclosure. It is to also be appreciated that the method 200 can include other features not specifically identified in the flowchart of FIG. 5.

While the best modes for carrying out the disclosure have been described in detail, those familiar with the art to which this disclosure relates will recognize various alternative designs and embodiments for practicing the disclosure within the scope of the appended claims.

The invention claimed is:

1. A transmission for a vehicle, the transmission comprising:
   a housing defining a cavity and a recess disposed inside the housing, with the recess extending outwardly away from the cavity along a longitudinal axis;
   a clutch disposed inside the cavity;
   a guide member disposed inside the cavity and defining a first path and a second path spaced from each other, with at least one of the first and second paths in fluid communication with the clutch; and
   wherein the guide member includes a mounting portion disposed in the recess and engaging the housing in an interference fit to secure the guide member to the housing;
   wherein the clutch includes a hub rotatable about the longitudinal axis, with the hub defining a first passage transverse to the longitudinal axis and in fluid communication with the first path, and the hub defines a second passage transverse to the longitudinal axis and in fluid communication with the second path.

2. A transmission as set forth in claim 1 wherein the guide member defines a third path spaced from the first and second paths, with the first and second paths in fluid communication with the clutch.

3. A transmission as set forth in claim 2 further including a shaft disposed in the cavity and rotatable about the longitudinal axis, with the shaft defining a passageway along the longitudinal axis and in fluid communication with the third path.

4. A transmission as set forth in claim 2 wherein the first, second and third paths each extend into the mounting portion of the guide member along the longitudinal axis, and wherein the mounting portion defines a first inlet transverse to the longitudinal axis to intersect the first path such that the first inlet is in fluid communication with the first path, and wherein the mounting portion defines a second inlet transverse to the longitudinal axis to intersect the second path such that the second inlet is in fluid communication with the second path, and wherein the mounting portion defines a third inlet transverse to the longitudinal axis to intersect the third path such that the third inlet is in fluid communication with the third path.

5. A transmission as set forth in claim 4 wherein the recess includes a wall portion defined by the housing and the housing defines a first channel, a second channel and a third channel each disposed transverse to the longitudinal axis and each intersecting the wall portion of the recess, and wherein the mounting portion engages the wall portion in the interference fit such that the first inlet aligns with the first channel to provide fluid communication between the first channel and the first inlet, the second inlet aligns with the second channel to provide fluid communication between the second channel and the second inlet, and the third inlet aligns with the third channel to provide fluid communication between the third channel and the third inlet.

6. A transmission as set forth in claim 4 wherein the guide member defines a first outlet transverse to the longitudinal axis to intersect the first path such that the first outlet is in fluid communication with the first path, with the first outlet spaced from the first inlet, and wherein the guide member defines a second outlet transverse to the longitudinal axis to intersect the second path such that the second outlet is in fluid communication with the second path, with the second outlet spaced from the second inlet.

7. A transmission as set forth in claim 1 wherein the recess includes a wall portion defined by the housing, and the wall portion defines an inner diameter, and wherein the mounting portion includes an outer surface defining an outer diameter complimentary to the inner diameter such that the outer surface engages the wall portion when the mounting portion is disposed in the recess to provide the interference fit.

8. A transmission as set forth in claim 1 wherein the guide member includes a plurality of flanges spaced from each other along the longitudinal axis and each extending outwardly away from the longitudinal axis, with each of the flanges defining a groove facing the clutch, and further including a plurality of seals, with one of the seals disposed in each of the grooves and each of the seals engage the clutch for sealing between the flanges and the clutch.

9. A transmission as set forth in claim 8 wherein the guide member includes a stem portion adjacent to the mounting portion along the longitudinal axis, with the first and second paths extending into the mounting and stem portions, and wherein the flanges extend from the stem portion.

10. A transmission as set forth in claim 9 wherein the housing includes an abutment extending outwardly into the cavity along the longitudinal axis adjacent to the recess, with one of the flanges of the stem portion engaging the abutment when the mounting portion is disposed in the recess such that the flanges are disposed outside of the recess.

11. A transmission as set forth in claim 9 wherein the stem portion of the guide member defines a first outlet in fluid communication with the first path and the clutch, and wherein the stem portion of the guide member defines a second outlet in fluid communication with the second path and the clutch, with the first outlet disposed between a pair of the flanges and the second outlet disposed between another pair of the flanges.

12. A transmission as set forth in claim 11 wherein the guide member further defines a third path spaced from the first and second paths, with the first, second and third paths each extending into the mounting and stem portions along the longitudinal axis, and wherein the mounting portion of the guide member defines a first inlet transverse to the longitudinal axis and intersecting the first path, and the first outlet intersects the first path such that the first inlet and the first outlet are in fluid communication with each other, and wherein the mounting portion of the guide member defines a second inlet transverse to the longitudinal axis and intersecting the second path, and the second outlet intersects the second path such that the second inlet and the second outlet are in fluid communication with each other, and wherein the mounting portion of the guide member defines a third inlet transverse to the longitudinal axis and intersecting the third path such that the third inlet and the third path are in fluid communication with each other.

13. A transmission as set forth in claim 1 wherein the recess extends outwardly away from the cavity along the longitudinal axis to a base portion defined by the housing, with the base portion disposed transverse to the longitudinal axis, and wherein the guide member includes a stem portion adjacent to the mounting portion along the longitudinal axis, and wherein the mounting portion includes a first distal end facing the base portion within the recess and the stem portion includes a second distal end spaced from the first distal end along the longitudinal axis and disposed outside of the recess, with the first and second paths extending into the mounting and stem portions along the longitudinal axis such that the first and second paths are spaced from the first distal end and the first and second paths intersect the second distal end.

14. A transmission as set forth in claim 13 further including a first plug disposed in the first path adjacent to the second distal end for minimizing fluid communication outside of the first path at the second distal end.

15. A transmission as set forth in claim 13 further including a second plug disposed in the second path adjacent to the second distal end for minimizing fluid communication outside of the second path at the second distal end.

16. A transmission as set forth in claim 1 wherein the hub defines an aperture along the longitudinal axis such that a portion of the guide member is disposed in the aperture.

17. A transmission as set forth in claim 16 wherein the guide member includes a stem portion adjacent to the mounting portion, and wherein the portion of the guide member is further defined as the stem portion disposed in the aperture of the hub, with the first and second paths each extending into the mounting and stem portions along the longitudinal axis, with the stem portion defining a first outlet transverse to the longitudinal axis to intersect the first path such that the first path, the first outlet and the first passage are in fluid communication with each other, and wherein the stem portion defines a second outlet transverse to the longitudinal axis to intersect the second path such that the second path, the second outlet and the second passage are in fluid communication with each other.

18. A transmission for a vehicle, the transmission comprising:
- a housing defining a cavity and a recess disposed inside the housing, with the recess extending outwardly away from the cavity along a longitudinal axis;
- a clutch disposed inside the cavity;
- a guide member disposed inside the cavity and defining a first path and a second path spaced from each other, with at least one of the first and second paths in fluid communication with the clutch; and
- wherein the guide member includes a mounting portion disposed in the recess and engaging the housing in an interference fit to secure the guide member to the housing;
- wherein the recess extends outwardly away from the cavity along the longitudinal axis to a base portion defined by the housing;
- wherein the guide member includes a stem portion adjacent to the mounting portion along the longitudinal axis; and
- wherein the mounting portion includes a first distal end facing the base portion within the recess and the stem portion includes a second distal end spaced from the first distal end along the longitudinal axis and disposed outside of the recess, with the first and second paths extending into the mounting and stem portions along the longitudinal axis such that the first and second paths are spaced from the first distal end and the first and second paths intersect the second distal end.

* * * * *